United States Patent

[11] 3,632,993

[72] Inventor Norbert Karl Acker
Falltorweg, Germany
[21] Appl. No. 852,571
[22] Filed Aug. 25, 1969
[45] Patented Jan. 4, 1972
[73] Assignee Scanner, Inc.
Houston, Tex.

[54] COLOR CODE SYSTEM
11 Claims, 5 Drawing Figs.

[52] U.S. Cl. .......... 235/61.11 E, 250/236
[51] Int. Cl. .......... G06k /712
[50] Field of Search .......... 340/146.3 K; 235/61.11 F; 250/236

[56] References Cited

UNITED STATES PATENTS

| | | | |
|---|---|---|---|
| 2,899,132 | 8/1959 | Orthuber | 235/61.11 |
| 3,196,393 | 7/1965 | Siegemund | 235/61.11 |
| 3,457,422 | 7/1969 | Rottmann | 250/236 X |

*Primary Examiner*—Thomas A. Robinson
*Attorney*—Smyth, Roston & Pavitt

ABSTRACT: Systems for reading information from a carrier is disclosed, the information having random position and random orientation on the carrier and being contained in differently colored data fields collectively identifying the data field carrier. The data fields are monochromatically read individually, the reading of each data field being preceded by an image producing, alignment and orientation process to obtain proper readout position to the reading device. The data read from the different fields on the carrier are assembled to identify the carrier.

Figures 1, 1A:
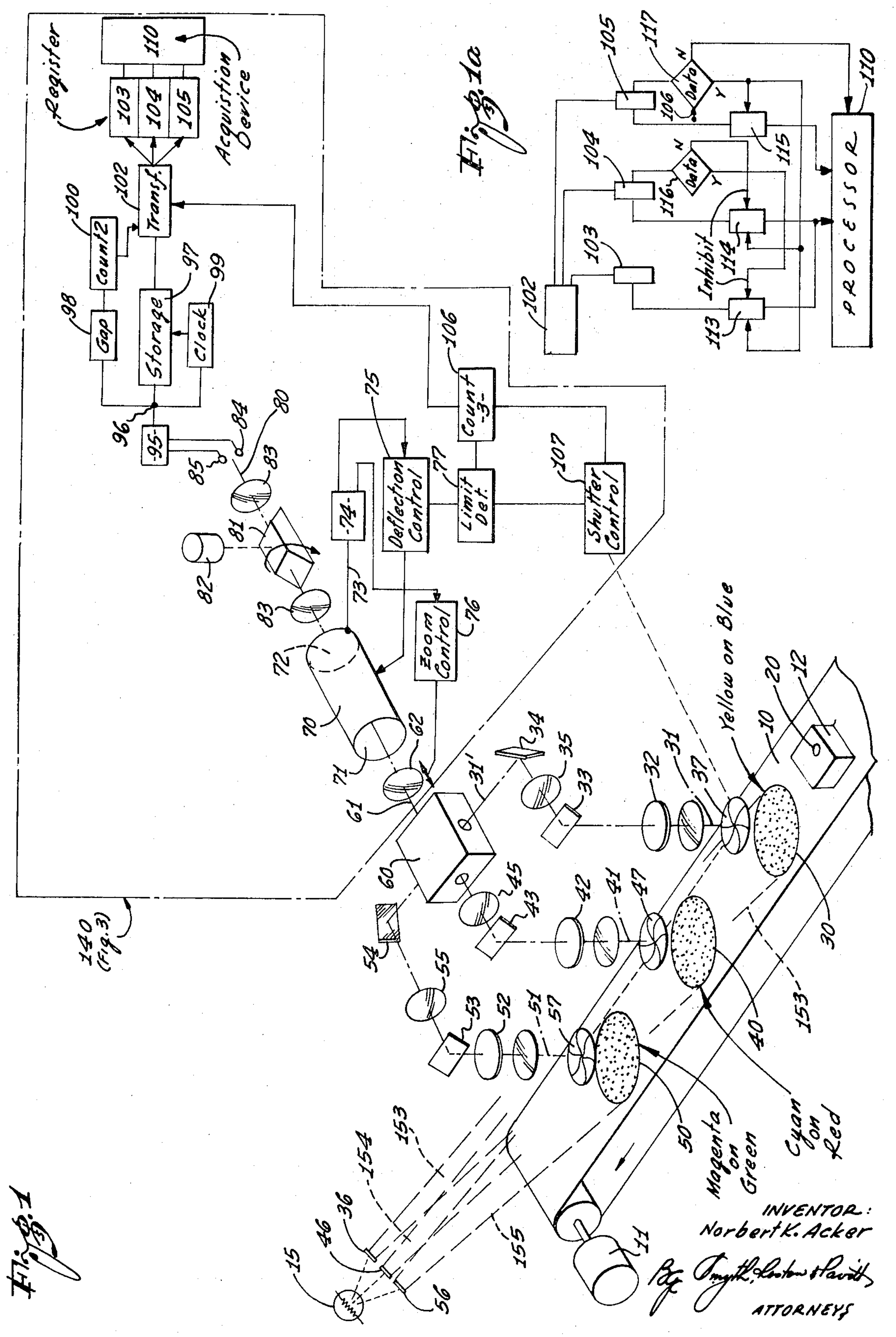

INVENTOR:
Norbert K. Acker

By Smyth, Roston & Pavitt
ATTORNEYS

INVENTOR:
Norbert K. Acker

By Smyth, Roston & Pavitt
ATTORNEYS

COLOR CODE SYSTEM

The present invention relates to a device, apparatus and method for identifying data carriers by machine reading of information having random position and random orientation when passing through a particular area. In my copending application Ser. No. 788,302, filed Dec. 31, 1968, hereinafter identified D–3463 as I have propose a system according to which an image of a data field is provided at first when passing through the particular area. As the data field has random position and orientation within the area, the image has likewise random position and orientation relative to a data field reading device, such as a detector or a plurality of detectors. The relative position between the data field reading device, on one hand, and the image of the data field on the other hand, is changed through lateral, as well as rotary shifting. The data field image is thus being particularly disposed in relation to the data reading device to obtain data field readout in the correct lateral as well as angular position. It is obviated thereby to handle the data field carrier itself for the reading process.

In my copending applications Ser. No. 818,030, filed Apr. 21, 1969, and Ser. No. 817,680, filed Apr. 21, 1969, hereinafter respectively identified as D–3460 and D–3461, I have proposed improvements of and details for the basic system concerning among others, the configuration of the data field and of the recording format. Further improvements relate to the processing of the signals read, code detection, format checking, etc. Still further improvements relate to particulars for the detection of random position and orientation of a data field image, to provide centering control of such image so as to place it into particular relation to the data field image reading device.

The present invention relates to improvements of the basic system as disclosed in the copending application D–3463, but these improvements find also utility in improved systems as disclosed in the other two copending applications referred to above. The present invention will find particular utility in cases where different items of merchandise are identified (a) concurrently by different identification indicia and/or (b) differently at different times.

Data fields to be detected for being read as to the digital or other coded information contained in them are usually attached to or part of items of a "carrier" such as a document, an item of merchandise, containers, or the like, and the information particularly identifies such item. In the preferred form of practicing the present invention, it is suggested to use a plurality of data fields exhibiting different color contrasts for associatively identifying the carrier. For example, a data field label with a first color contrast may identify an item of merchandise by serial number and/or model-type code or the like. A second label with a second different color contrast may identify the price of the item. Individually, the two data fields identify the item differently from two different points of view; object classification is one, price category the other. Together the data fields identify the item to the extend needed for automatic merchandise processing. A third label of still different color contrast may be affixed occasionally, stating a modified price, for example, if the particular item is discounted.

Preferably, the data fields are similarly shaped, i.e., they have similar overall format, and they are sequentially observed, centered and read out. As the data fields pass through an inspection area, different colored images of the inspection area or portions thereof are provided to produce a contrasting image of but one data field. That image is centered and its information is read. Hence, each of the differently colored images is centered individually in relation to data readout equipment designed to read each of the differently colored but similarly contoured data field images. The differently colored labels do not have a particular position relation to each other, nor do they have to have a fixed and preassigned place on the item to which they are affixed. The data field on each label is individually imaged and the image is centered independently from the centering operation of a data field on a differently colored label.

Further processing of the signals as read out depends on the significance of the differently colored labels. For example, an item of merchandise may normally have a blue label and the encoding identifies the regular price. In case of a sale, a red label with encoded discount price may be added to some of the items. Thus, the data readout equipment will provide signals in representation of the regular "blue label price" if a red label is not detected; the readout equipment will provide signals in representation of the discount price on the red label if there is a red label. The blue label price, if it has already been ascertained, will be disregarded if there is a red label.

One can see that automatic merchandising handling for delivery particularly including automatic price acquisition is greatly facilitated by operatively distinguishing between regular price and discount price on basis of color contrast detection. A label of a third color, for example, green, may be provided on the item, identifying the item itself by a contrasting code. This code may be a simple class identification such as "-brand X, 16 ounce carrots." The signals resulting from readout of that code are associatively assembled for further processing (inventory, etc.), with the data read from the red or from the blue label. Of course, the readout signals derived from reading all of the different color-contrasting data fields on the same item can all be associatively assembled for further processing and evaluation, to identify the item, up to the point that the item becomes uniquely identified.

The term "color-contrast" is used herein the sense that a data field may have a background of particular color and bears markings as data proper, as well as for control purposes, and the markings have the complementary color or are black. Alternatively, the background may be colored or black and the markings may have complementary color. Still alternatively, the data field markings defining information may provide color contrast by color-on-complementary-color and the control markings may be color on black, or the relationship may be a reversed one.

Figure 2B:
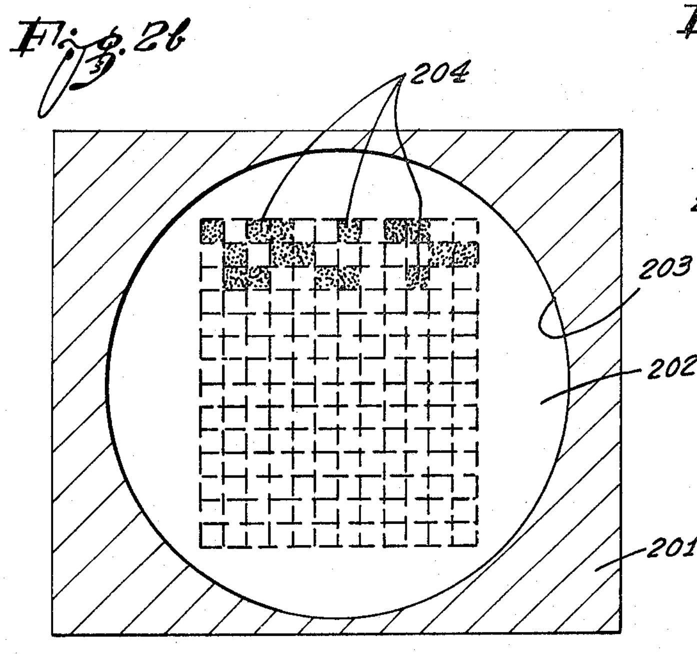
Figure 2A:
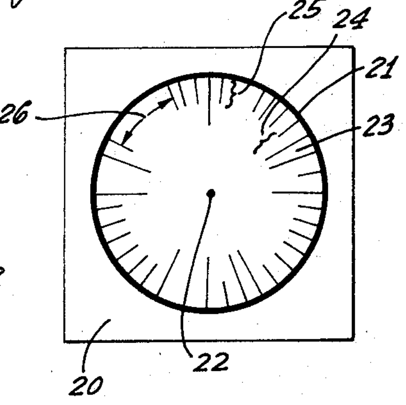

The invention, the objects and features of the invention and further objects, features, and advantages thereof will be better understood from the following description taken in connection with the accompanying drawings in which:

FIG. 1 illustrates schematically a first embodiment of the invention;

FIG. 1*a* illustrates schematically supplementing elements for the system shown in FIG. 1;

FIGS. 2*a* and 2*b* illustrate top views of data field labels; and

Figure 3:
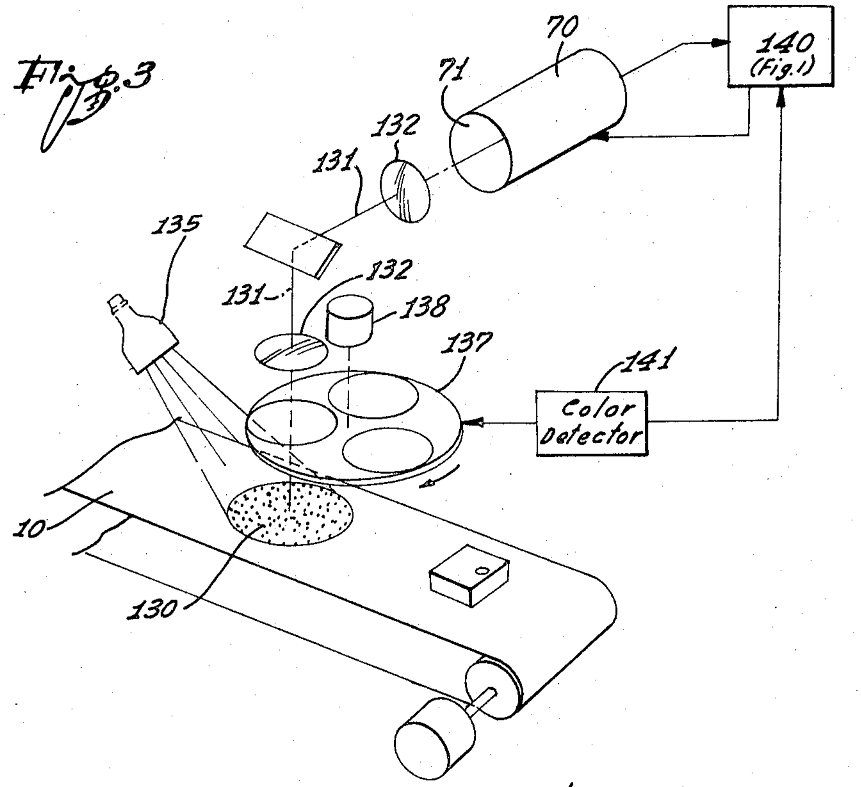

FIG. 3 illustrates schematically a second embodiment of the invention.

Proceeding now to the detailed description of the drawings, in FIG. 1, thereof, there is illustrated a system in which the preferred embodiment of the present invention is practiced with advantage. There is provided a conveyor belt 10 driven by a motor 11 at constant speed or as may be preferred here, at intermittently variable speed with a slowdown occurring particularly during phases of scanning and detection operations to be described more fully below.

The conveyor belt transports items 12, such as documents, items of merchandise, such as packages, containers, or the like. Each of these items is provided with at least one data field 20 and thus serves, in a general sense, as a data storage carrier. Generally, there will be a plurality of different data fields on such a carrier, collectively identifying same. Representative examples for such data fields are shown in FIGS. 2*a* and 2*b*.

As shown in FIG. 2*a*, a data field is comprised of what can be described as a background label 20 having a particular color; preferably it has one of three prime colors such as red, green and blue, or yellow, cyan and magenta. The label is provided with a circular recognition marking 21. Data are contained inside the area circumscribed by boundary marking 21. The data are particularly arranged in concentrical tracks extending around a center 22 of boundary marking 21. As stated above, the data markings may be black or have the respective complementary color.

In lieu of printing, the markings may be punched out, and a different colored or black label is affixed underneath the label with the punched out holes. The data field contour is shown here by way of example only. The field may have additionally a central marking of the type and for the purpose as disclosed in my copending application (D–3461).

In the alternative, the data field may be quadrilateral as shown in FIG. 2*b*. The label 20 in FIG. 2*b* may have originally a particular dye-layer of particular fluorescent color. A control marking is imprinted for covering an area 201 which circumscribes a circular area 202, not printed upon and delineated by a circular boundary line 203. Area 201 may have color which is complementary to the color of the original dye-layer remaining exposed in area 201; alternatively, area 201 may be black.

Area 201 contains the data field proper assumed to be comprised of a matrixlike field, having markings 204 of a color similar to the color of area 201, to exhibit contrast relative to area 202 therein. The markings 204 define data bits of particular value, and absence of a data bit in a bit position within the information field represents a bit of opposite value.

The label when illuminated with monochromatic light having frequency equivalent to the color of the original dye where exposed will show bright reflection throughout area 202 except where covered by the markings 204. Hence the round field 202 will be brightly visible in such light, bounded by a dark area along a sharply contrasting boundary 203, and containing darkly appearing markings (204).

An item of merchandise 12 on conveyor belt 10 will have more than one of these labels as shown in FIGS. 2*a* and 2*b* and they distinguish by different color contrasts. For reasons of practicality, three different prime colors should be used only, as was mentioned above, for the labels and markings should have the respective complementary color or black, or vice versa.

For practicing the invention it is not necessary that any of these data field labels has a particular position and orientation on the respective item 12, nor do they have to have particular position and orientation relative to each other. It is emphasized, however, that such random position and orientation is not a prerequisite, but merely points to the most general case which can be made subject to successful data acquisition by the equipment as described here. The only limitation is that data fields should be on a surface of a package or container which faces generally in one direction, for example, in up direction, without, however, requiring that these various data fields on the various packages are plane parallel. Thus, the containers do not have to have similar height.

For practicing the invention it is, furthermore, not necessary that the items 12 have particular position on the conveyor belt 10 in lateral, as well as longitudinal direction, as far as direction of transport movement is concerned. In particular, the items and, therefore, the data field labels on them do not have to be regularly spaced along the conveyor belt nor do they have to travel in an aligned relationship, i.e., they do not have to travel along one particular line as far as movement of any data field centers on them is concerned. However, in the particular embodiment, as shown in FIG. 1, there should be a minimum distance between the various items of merchandise which will be defined more fully below. However, this restraint is further narrowed in the embodiment shown in FIG. 3.

As conveyor belt 10 moves, items 12 with one or more data field labels thereon will pass in sequence through a plurality of search fields or inspection areas 30, 40 and 50. From a different point of view, areas 30, 40 and 50 can be regarded as different sections of a general inspection area. The centers of these inspection fields may be defined by optical axes 31, 41 and 51 and an extension 61 thereof. Additionally, or in the alternative, the search or inspection fields may be defined through illumination from a source 15, having three different output paths 153, 154 and 155 respectively projecting cones of light onto the conveyor belt to define illuminating fields 30, 40 and 50 thereon.

In the embodiment illustrated it is assumed that color filters 36, 46, 56 are respectively provided in the illumination paths 153, 154 and 155, so that the search fields 30, 40 and 50 are illuminated and/or established by different colored lights. The three different colors should correspond as accurately as possible to the three different colors of data field labels 20 or of the markings thereon.

In order to facilitate description it may be assumed that black, or blue, red and green labels are used as background for the data fields and markings in yellow, cyan and magenta are respectively provided on the background labels. The filters 36, 46 and 56 are now respectively transmissive narrowly to yellow, cyan and magenta light to respectively illuminate fields 30, 40 and 50 with light of these colors. As a consequence, only a black or blue label with yellow markings produces contrasting reflection in the illumination of field 30, the other data fields exhibiting little contrast. Contrasts are produced in field 40 by cyan markings on a red or black label to the exclusion of the other colored labels, and contrasts are produced in field 50 by magenta markings on a green or black label. Other contrast combinations will be discussed below.

The illumination source 15 is preferably a pulsating one, either because an alternating or pulsating voltage drives the source, or by operation by a light chopper (not shown). Any detected reflection resulting from the pulsating illumination includes the pulsations as a carrier frequency signal, and any local contrast observed in the respective inspection and search fields by optical equipment along the respective axes 31, 41, 51 appear as amplitude modulations of such carrier frequency signals. This way reflections resulting from ambient sources can be eliminated by frequency discrimination.

Turning first to the optical equipment on axis 31, there is provided a lens system 35 and a pair of reflectors such as mirrors 33 and 34. In the illustrated embodiment the assumption has been made that labels are found or top surfaces of the items 12 on conveyor 10, and that further optical image detection equipment is oriented horizontally, thus necessitating redirection of light beam and optical axis. Mirror 33 directs imaging rays along optical axis 31 from the vertical, up direction onto a lateral, horizontal direction, and mirror 34 reflects again at right angles to the latter but still in the horizontal so that imaging rays provided by operation of the lens system 35 extends along the horizontal axis 31′.

The optical path as between the optical axis 31, 31′ may include a color filter 32 which is transmittent only to the light illuminating field 30 by operation of filter 36. Provision of both filters 32 and 36 is a precautionary measure to enhance contrast. Actually, only one of these filters is needed which includes the possibility that actually all three fields, 30, 40, 50 are illuminated by white light. This, however, is advisable only if neither markings nor labels are black, otherwise the signal-to-noise ratio of the system would be rather low.

If an item of merchandise with a black or blue data field label attached enters search field 30, contrast containing imaging rays will be provided along the optical path 31, 31′ by brightly reflecting yellow markers thereon, establishing the contrast when imaged by the lenses of system 35. The optical axis 31′ extends into a beam combining prism 60 which redirects imaging rays coming along axis 31′ and the axis itself, into direction along axis 61, which is a combination of axes 31–31′ for yellow light. A lens 62 may be provided on axis 61 which together with the lens system 35 completes an imaging path to project an image of search field 30 onto a screen 71 of an electron optical image converter 70.

The optical system along axis 41 includes the following elements. There is, first of all, a mirror 43 which redirects the optical axis 41 and any rays therealong toward beam combining prism 60 such that the extension of the redirected optical axis 41 is also flush with axis 61. The optical equipment along optical axis 41 includes a lens system 45 which, together with the lens 62, completes an imaging path for providing an image of the search and inspection field 40, likewise onto the input screen 71 of an electron optical image converter 70.

By operation of filter 46, search field 40 provides cyan illumination. The optical path along axis 41 may include additionally, or in the alternative, a similar cyan, transmissive filter 42, so that the cyan markers in the one data field are imaged at sufficient contrast by the system 45–62. Other colored labels will not be imaged at sufficient contrast onto screen 71.

Finally, search and inspection field 50 is established by magenta illumination, through the magenta transmissive filter 56. The optical equipment along axis 51 includes additionally, or in the alternative, a similar, transmissive filter 52. An imaging system is disposed on axis 51. Redirecting mirrors 53 and 54 direct the rays imaging field 50 into the beam combiner 60 from a still different direction, which is actually the opposite direction of one provided by mirror 34, the redirected optical axis 51 merges also with axis 61. System 55 cooperates with lens, or lens system 62 to provide a cyan colored image of the search field 50 onto screen 71.

It follows, therefore, that during movement of conveyor belt 10 a data field carrier such as an item of merchandise passes progressively through the three search and inspection fields 30, 40 and 50. When in and while passing through each of these inspection fields, an image thereof is produced and projected respectively in one of the three different colors onto the input side 71 of electron optical image converter 70. This item of merchandise may have three different colored labels, each containing a data field, but the markers of only one of these data field labels will be imaged at sufficient contrast onto the screen 71.

In order to enhance contrast further, shutters 37, 47 and 57 respectively may be included in the three optical paths prior to being combined by prism 60. The shutter 37 is normally open and shutters 47 and 57 are normally closed. In response to control operations, to be described more fully below, these shutters change state so that during passage of an item of merchandise through the three inspection fields, illumination of but one path actually enters the optical input path for converter 70 as established along the axis 61. This sequential shutter opening and closing, however, is permissible only if all items of merchandise always have a yellow-on-blue data field, or, more generally, if they have a label of the operating color in the leading or first search field and optical path.

The image converter 70 can be of general construction and it includes an exit or target screen 72 onto which an image of the search field is produced electron-optically. The entrance window 71 of converter tube 70 receives differently colored images, but the tube itself operates on polychromatic inputs, so that the electron optically produced image on target screen 72 is represented by local contrasts regardless of color.

The image converter 70 is presumed to include electron optical equipment permitting lateral deflection of the electrons producing the image and, therefore, of the image itself. The tube includes two pairs of deflection electrodes, one pair for vertical deflection, and another pair for horizontal deflection, of any image as produced onto the screen 72. The terms "vertical" and "horizontal" are used here only in relation to the illustrated directions. In general these two deflection electron systems provide lateral image displacement in two orthogonal directions within the image plane as defined by screen 72 of converter 70.

Details of the construction of target screen 72 will not be discussed in this case. Examples for such target screens are disclosed in my copending applications (D–3460, D–3461, D–3463). It suffices to say that the screen 72 includes detector elements constituting a recognition device, or more particularly, a data field image detection and recognition device providing output signals through a cable 73 having a plurality of lines, and the signals on these lines represent collectively relative positions of the image of the data field as electron optically imaged onto target screen 72.

The signals in the lines or cables 73 pass through a logic circuit 74 for processing therein. In essence, the signals as provided through cable 73 define the relative position of a data field on target screen 72. These signals are processed first in logic circuit 74 in order to produce command signals for a control circuit 75 which controls the voltage on the deflection electrodes in tube 70. This operation inturn controls image deflection in tube 70 so as to obtain a particular position of a data field image on screen 72.

Additional logic signals derived from logic 74 are processed in a control circuit 76, which, in turn, operates on the magnification as provided by lens system 62 to control the size of the optically produced image on entrance 71. If a data field has format as shown in FIG. 2*a* and is illuminated by light having the color of markings 21 and 23, the markings will provide brightest reflection in the particular inspection field, and the detector elements of the recognition device on or at target 72 will respond to the brightest image increments. Logic 74 controls the image size and deflection, to particularly position the center of the data field image, as defined by center 22 of circular boundary marking 21, onto screen 72.

If the data field has format as shown in FIG. 2*b*, the image of area 202 is the brightest image element produced as the data field passes through an illumination beam having the color of area 202. The deflection control will then center the image of the data field, particularly with regard to the center of circle 203. In each of these cases centering is completed if none of the detector elements of the recognition device detects, for example, a bright image increment resulting from reflection on any of the areas 21, 23 and 202. Centering is completed if the image of the one contrast producing data field has been laterally shifted until the center thereof is on an optical axis 80.

It is presumed that the electron optically produced image of the data field on screen 72, at least when in proper readout position, is optically detectable. An optical system 83 having axis 80 as its optical axis reproduces a properly positioned data field image on screen 72 as object. The reproduced image appears in an image plane in which there are two detectors 84 and 85. The data detector circuit described next presumes a data field format as shown in FIG. 2*a*.

As was described above, data tracks 24 and 25 of data field as shown in FIG. 2*a* extend concentrically around the center thereof. The two photoelectric detectors 84 and 85 in the image plane of optical system 83 are disposed at radial distances from the point where optical axis 80 traverses the image plane, which distances are respectively equal to the radii of data tracks 24 and 25 multiplied by the overall magnification of the entire imaging system, as provided between any of the search fields and the image plane of optical system 83.

For readout of such data field, rotation between data field image and readout elements is required. In my copending application (D–3461) I have disclosed apparatus to rotate the unoriented search field image to establish a sweep search operation. A properly centered data field image automatically rotates about its own center. This then presupposes an image rotating element on optical axis 61 requiring no further measures for causing rotation of the reproduce data field image over detectors 83 and 84.

Presently it is assumed that there is no image rotation device in the optical path on axis 61. Instead, there is a dove prism 81 included in the optical path along axis 80 which is driven for rotation about axis 80 by operation of a motor 82. This is analogous to image rotation as disclosed in my copending application D–3460 and application D–3463. The image of the data field as projected into the image plane of optical system 83, rotates about the image of the center 22 of the data field. Pursuant to such rotation, the track images pass over the two detectors 84 and 85 progressively so that the tracks are read by operation of this rotation.

An AC processing network 95 is connected to the two detectors 84 and 85 in order to render further signal processing responsive to signals only having the carrier modulation as provided by the illumination source 15. The AC processing network 95 includes, additionally, demodulators to provide two trains of output signals in a two line cable 96. These output signals have digital significance. The signals read during rotation of the data field image and after AC processing in network 95, are set into a temporary storage device 97. A gap detector 98 is connected to cable 96 in order to detect the beginning and end of the data tracks.

A shift clock 99 is connected to cable 96 to operate in synchronism with the readout bit rate, which is the rate of presentation of the data bits during this readout process by operation of rotation of the data field image. The clock 99 operates essentially for shifting the bits as sequentially presented in channel 96 into storage device 97. The storage device 97 may include registers as well as circuitry checking on the format of the digital information. Furthermore, the storage device includes facilities to assembly characters representing the information contained in a data field. An example of this type is disclosed in my copending application D-3460.

After "gap" has been detected twice, an entire data field has been read. A gap counter 100 responds to the "gap-twice-detected" situation to control the transfer of information read from a particular color contrasting data field, into one of the registers 103, 104 or 105. The registers taken together are a facility which assembles the information read from all differently colored data fields on *a* carrier. Thus, the content of registers 103, 104 and 105 identifies the carrier.

The transfer channel 102 connecting storage device 97 to the three registers 103, 104 and 105 is under control of a three state counter 106, causing, for example, transfer from storage device 97 to register 103 when in count state zero, to register 104 when in count state one and to register 105 when in state two, whereafter counter 106 recycles to count state zero. In addition, counter 106 controls the shutter control mechanism 107; if shutters are provided, to keep shutter 37 open (and shutters 47 and 57 closed) at count state zero, shutter 47 open (shutters 37 and 47 57 closed) at count state one and shutter 57 open (shutters 37 and 47 closed) at count state two.

Counter 106 can be operated in various ways, one mode of operation being the following. The control provided by image deflection control network 74 and 75 causes a data field image to remain centered in relation to optical axis 80, despite the fact that the item 12 bearing the data field label moves through an inspection field. The image position control operates as followup control. However, as the item continues to travel, the deflection control particularly as provided by network 75, will soon reach a limit, or the data field on the merchandise reaches the boundary of the search field or both. A limit detector 77 is connected to deflection control 75 and provides a pulse each time the limit of followup control has been reached The pulses increment counter 106, which controls channel 102 as well as shuttle control 107.

The apparatus and system as described thus operates as follows. Normally, shutter 37 is open and the devices 97, 103, 104 and 105 are ready to receive information, counter 106 is at count state zero. As an item of merchandise as a multiple data field carrier enters the search field 30, the yellow-on-blue (or yellow-on-black) data field is the brightest contrasting image provided along axes 31–61 onto tube 70. The other data fields do not provide sufficient contrast. The recognition device causes the image of a yellow boundary ring 21 to be centered, and detectors 84 and 85 read the data from the rotating reproduced data filed image. The data are set into storage device 97, and after the data gap a has been detected twice, the data is transferred to register 103, designed to hold the "yellow-on-blue" data.

As the conveyor belt continues, the followup control for the image-positioning control soon reaches its limit, device 77 responds and increments counter 106. Shutter 37 closes and shutter 47 is opened to prepare the system for the arrival of the data carrier in the "cyan" search and inspection field 40. Additionally, register 104 is prepared for transfer. As the data carrier enters field 40, an image of the cyan-on-red or cyan-on-black label will be produced onto screen 71 at sufficient contrast, while the other colored labels do not provide any or insufficient contrast on screen 71. Of course, the cyan-on-red or black data field label has random position in relation to the previous produced image of the yellow-on-blue or black label, so that the centering operation, with regard to the position of the image of the cyan-on-red or black data field on screen 72 proceeds completely anew, but causing the image on the latter data field also to be centered in relation to axis 80. As the reproduced image thereof is rotated by operation of the dove prism it passes over the detectors 84 and 85. The data are read from the data field track images by the detectors 84 and 85 and the resulting readout signals are processed as aforedescribed After two gap detections the data is transferred from store 97 to register 104.

The data carrier continues to progress by operation of conveyor belt 10. Deflection control 75 reaches its limit again and limit detector 77 responds. Counter 106 responds, shifts to count state 2 and prepares register 105. Shutter control device closes shutter 47 and opens shutter 57. The magenta-on-green or black label will soon enter field 50 and the image-centering and readout operation is carried out in an analogous manner, and the content of that data field is set into register 105.

After the item of merchandise leaves search field 50 limit device 77 responds again and resets counter 106 to indicate that a cycle has been completed. The system stays in that state until another item of merchandise enters search field 30.

After the cycle control counter 106 has run through a complete cycle, the data is transferred from the three registers 103, 104 and 105 to a data acquisition device 110 for further processing. These data in toto particularly identify the data carrier such as an item of merchandise, which has just passed through the three search fields and the three labels of which have just been read. It should be mentioned that the device operates in this manner even if an item does not have all three labels. If a label is missing (intentionally or otherwise), the image centering device for that particular color never "homes in" and there are no data of that particular color contrast. The processor deals with the situation, i.e., absence of data in one particular register as required.

As was mentioned in the introduction, an item may have a regular price label, for example, as "yellow-on-blue" contrast information. A "cyan-on-red" label is provided only in case of a sale and the price as defined by the "cyan" information supercedes the prices defined by the "yellow" information. A preprocessing operation may assess the situation as described in the following with reference to FIG. 1*a*.

After an item of merchandise has been optically processed as described, data are held in all three registers 103, 104 and 105 or in registers 103 and 105 only. The latter situation is the normal cause with the content of register 103, for example, defining the regular price and the content of register 105 identifying the item so priced by store code, serial number, type code, etc. A gate assembly 116 is connected to register 104 to test presence of any data therein, and provides "yes" or "no" outputs, V or N, respectively, in representation of the outcome of the test. An analogous test unit 105 tests presence of a data content in register 117 and is enabled by counter 106 after the counter has run through a cycle. If there are no data in register 105, there must be error, and the test unit 117 so signals to the processor, If data are in register 105, a set of transfer gates 115 is opened to transfer the item identifying code to processor 110. If a discount price is held in register 104, a set of transfer gates 114 is opened concurrently to transfer the sales price to processor 110. Register 113 holds the regular price but its set of transfer gates 113 is inhibited from test unit 116 in case a discount price supercedes the normal price.

In case there was no sales price red label, data were not set into register 104, and test unit 116 may inhibit transfer for gages 114, but transfer gages 113 and 115 are not inhibited so that the transfer control pulse from unit 117 opens gates 113 ad 115 to transfer the normal price, together with the identifying code, to processor 110.

The circuit may be supplemental in that, for example, in case a discount price is held in register 104, the regular price as held in register 103 could be fed separately to processor 110, to permit, for example, tallying of the "loss" incurred by discounting.

It is apparent from the foregoing that this circuit operates properly if the items of merchandise follow each other at a space which is larger than the distance from the leading edge of search field 30 to the trailing edge of search field 50 in the direction of conveyor movement. If this restraint cannot be tolerated, the system shown in FIG. 3 should be used.

However, before turning to FIG. 3, it should be mentioned that the system as described operates under the constraint that each data carrier has, in fact, three different color-contrasting data fields. If this constraint has to be dropped, either the shutters have to be eliminated and the fixed association between register 103, 104 and 105, on one hand, and particular color information, on the other hand, has to be dropped, unless additional detection or a carrier relative to the search fields is provided to determine the color of the data field which is being read. One way of doing this is to eliminate the connection between limit detector 75 and counter 106 and to provide detectors as to the presence of a data carrier in search fields 30, 40 or 50. The resulting detector response signals, in fact, represent the color of the data field which is being read, and the shutter mechanism, as well as the transfer channels into registers 103, 104 and 105 can be controlled accordingly.

Turning now to the description of FIG. 3, there is illustrated a modified form of the invention in that a single polychromatic search field 130 is provided by a light source 135, establishing the object side for an imaging system 132 along an optical axis 131. An image of the search field 130 is projected onto the input side 71 of the image converter 70. The data readout circuit, optics, image rotation device and electron optical image deflection control is summarily designated with reference numeral 140 and it is assumed that it includes items such as 71, et seq., 80, et seq., and 90, et seq.

The optical path along axis 131 now includes a three-sector filter 137 respectively having blue, red and green (or yellow, cyan, magenta) transmitting filter sectors. These filters are mounted in a turret which is driven by a motor 138. The rotation must be such that the turret 137 revolves at least once during the period of passage of an item of merchandise through inspection field 130. For one-third of that period a particular filter is placed in the optical path, and each filter is operative at least once as the item passes through search field 130. The operation is thus similar as described above. The different colored data field are sequentially imaged, centered and read out. Three differently positioned and differently colored labels can be read during passage of the data field carrier through the single search field 130.

In this embodiment a "color detector" 141 may respond to the angular position of the turret 137 to provide signals which are representative of the color of the imaging rays as effective on the input side 71 of converter tube 70. This permits association between the particular color contrast of the data field that is read with the information content thereof without memory. The filter 137 may rotate continuously and it is basically uncertain which color label is read out first as that depends on the basically arbitrary position of the turret 137 at the time an item of merchandise as a data field carrier enters search field 130. The output of this color detector 141, therefore, controls the particular transfer channels into register 103, 104 and 105, depending upon the color. Of course, there is no shutter mechanism in this embodiment.

The invention is not limited to the embodiments described above, but all changes and modifications thereof not constituting departures from the spirit and scope of the invention are intended to be included.

I claim:

1. Apparatus for reading information from a carrier having plural data fields with contrasting data markings and a contrasting contour, the data fields with markings differing from each other by different color contrasts, the markings arranged along that contour, the contour marking defining the location of the data field, the data fields having random position and/or random orientation in a particular area and/or in relation to each other on the carrier, comprising:

first means disposed in relation to the particular area for imaging the particular area including providing images of the contrasting contours and images of the data markings of the differently color contrasting data fields when in the particular area;

first control means for rendering the first means color selective so that a contrasting image of but one data field is provided;

second means disposed in relation to the first means and including reading means for detecting the image of data markings when passing through a particular location and providing a signal train representative thereof;

the second means further including a plurality or data field, detector means for individually and separately detecting the relative position of the contrasting image of the contour as selected by operation of the control means from the area and providing control signals representative thereof and including at least one particular detector means for detecting the relative position of the image of the contour as representing the disposition of the image of the data markings relative to the reading means.

2. A device for reading information in a plurality of data fields, each data field defined by contrasting markings and a contrasting boundary, the markings of different data fields on the same carrier having different color contrasts and having random orientation and/or random position within a particular area and/or relative to each other on the same carrier, the combination comprising:

data reading means positioned in relation to the particular area, and providing signals in response to a data field imaged onto the reading means;

first optical means positioned in relation to the particular area and producing different, color contrast dependent images of at least a portion of said particular area, including respectively an image of a data field of a particular color when in the portion of the particular area to the exclusion of the data fields of different colors when concurrently in the portion of the particular area, and including means for producing an image of a portion of a particular area onto the data reading means, the image as effective on the data reading means no longer exhibiting color distinctive contrast, so that the data reading means is responsive to such image independently from the color contrast of the data field so imaged;

control means coupled to the first means to render the first optical means sequentially effective as to response to different color contrasts, so that the images of the portion of the particular area as sequentially produced, include different contrasts due to the different color contrasts of the different data fields;

second means disposed in relation to the first means and coupled to the control means to be responsive, sequentially and independently, to the images of data fields of different colors and operative to adjust the positions of the image of the data fields, independently from the color contrast, relative to the data reading means, and in sequential adjusting operations for each of the differently color contrasting data fields as imaged, including lateral shifting of the respective data field image along two transverse axes and rotational shifting, to obtain sequentially particular position for each of the images of the data fields relative to the data reading means, for sequential data field readout;

third means connected for controlling the data reading means for obtaining sequential data field readout in response to the particular position of each of the data field images relative to the data reading means as adjusted by operation of the second means; and fourth means connected to the data reading means and responsive to the signals provided by the data reading means during readout of data field images, to assembly representations of the data markings in the different colored data fields as sequentially read, to identify the carrier of the data fields.

3. The device as set forth in claim 2, the fourth means including means to process the readout result of a data field of first color contrast in dependence upon the data field of a second color contrast.

4. The device as set forth in claim 2, the fourth means including means to cause presence of a data field of a first color contrast to override presence of a data field of a second color contrast.

5. The device as set forth in claim 2, the fourth means including means to selectively assemble data read from differently color contrasting data fields on the same item.

6. In a device for identifying a data carrier having information in a plurality of data fields having different color contrasts and together identifying the data carrier, the data fields having random orientation and/or random position within a particular area and/or relative to each other, each data field holding data markings on a background area and in a particular contour format, markings on background having color contrast by color against complementary color or black, the combination comprising:

first means positioned in relation to the particular area and producing differently colored images of at least a portion of the particular area, each image including a contrasting image of one data field only when in the portion of the particular area to the exclusion of data fields of different color contrast when in the particular area; including means (a) defining an optical path for imaging a portion or portions of the particular area, and means (b) for rendering the optical path color selective for the production of contrasting images of but one data field at a time;

second means disposed in relation to the first means to be responsive individually to the images of each of the different fields as sequentially positioned by the first means and operative to adjust individually the position of each image of different color contrasting data fields relative to a particular position for each image of the data fields for data reading;

third means for reading the data contained in each different color-contrasting data field from the respective image thereof independently from the color and when adjusted for reading by operation of the second means;

and fourth means connected to the third means for assembling the sequentially produced readout results from different color contrast data fields to identify the carrier thereof.

7. The device as set forth in claim 6, the data fields being defined by markings on a background, at least one thereof being constituted by a fluorescent or phosphorescent dye.

8. The device as set forth in claim 6, the second means operating to place each of the data field images laterally into similar positions and including means for rotating each of the data field images about the respective center thereof.

9. In a device as set forth in claim 6, for identifying items of merchandise, each item of merchandise having at least a first data field of a first color contrast, and possibly having a second data field of a second color contrast different from the first contrast, the third means providing signal indications in representation of the data of the first data field in the absence of a second data field, and providing signal indications in representation of the data in the second data field when present as substitute for the data in the first data field on the same item of merchandise.

10. A device for processing items of merchandise or the like, identified by one or more data fields holding plural contrasting markings as information and having different color contrasts, including contrasting boundaries, the data fields having random position and/or random orientation to each other as well as in relation to a particular inspection area, the combination comprising:

first means, including reading means disposed for reading the plural contrasting markings of the information in a data field when imaged onto the reading means, and providing signals representative thereof;

second means defining an optical path of variable direction as between the reading means and the particular inspection area, for optically relating the area to the reading means;

third means included in the optical path and responsive to the contrasting contour of a data field as imaged for providing lateral displacement and rotation as between the data field image and the reading means to place the data field image in a reading position and to pass the latter image in particular orientation past the reading means, for the data reading means to read the image of the contrasting markings of the imaged data field;

fourth means included in the optical path to render the optical path color contrast selective so that only one of plural, differently color-contrasting data fields in the particular inspection area is effectively imaged, to operate the third means to the exclusion of other data fields in the area providing different color contrast substantially eliminating as to contrast by operation of the color selectively, so that the image of only the one data field is read by the data reading means;

fifth means operatively coupled to the fourth means, to change the color selectivity following completion of reading of a data field, for the third means to become responsive to a differently color-contrasting data field, to obtain lateral displacement, rotation and readout of image thereof; and sixth means connected to the reading means to be sequentially responsive to signals as provided by the reading means pursuant to reading differently color contrasting data fields from the same carrier, for identifying the carrier on basis of these signals.

11. A device as in claim 10, the sixth means including circuit means responsive to completion of reading of a data field image to control the fifth means for changing the color selectivity.

* * * * *